Oct. 23, 1928.  
L. J. MORGAN  
1,688,937  
AUTOMOBILE BODY, DOOR, AND WINDOW CONSTRUCTION  
Filed June 12, 1923   2 Sheets-Sheet 1
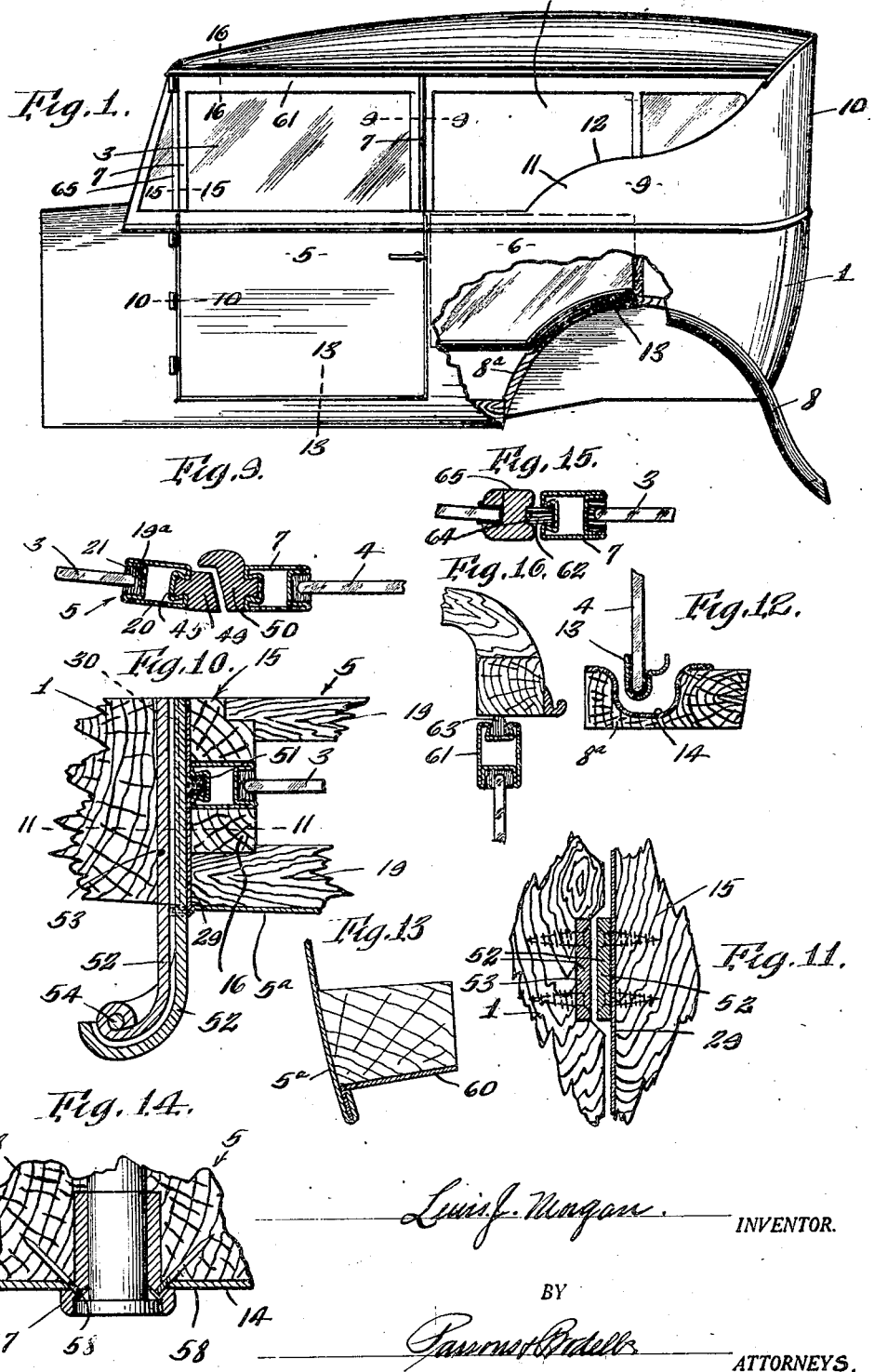

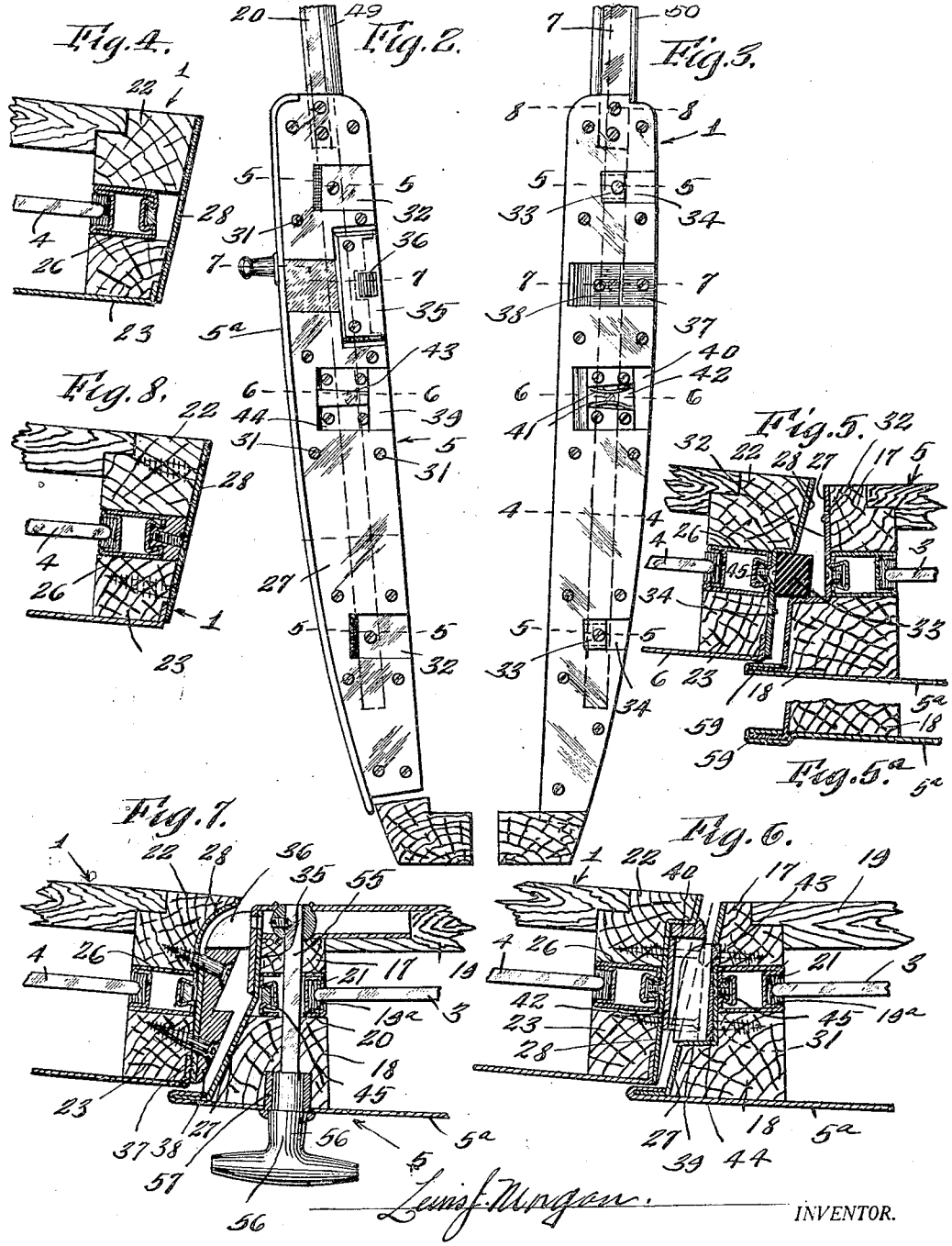

Patented Oct. 23, 1928.

1,688,937

UNITED STATES PATENT OFFICE.

LEWIS J. MORGAN, OF SYRACUSE, NEW YORK, ASSIGNOR OF ONE-FOURTH TO HARRY M. STRONG, OF SYRACUSE, NEW YORK.

AUTOMOBILE BODY, DOOR, AND WINDOW CONSTRUCTION.

Application filed June 12, 1923. Serial No. 644,890.

This invention has for its object an automobile body, door and window construction, which is particularly simple and economical and rigid in construction and highly efficient and durable in use.

The invention consists in the novel features and in the combinations and constructions hereinafter set forth and claimed.

More specifically it consists in the arrangement of panels in the body, windows movable vertically into and out of the panels and each having a lower corner portion removed to conform to the curve of the fender when down and to the curve of the edge of the side wall or forward extension in the back curtain or panel when the window is elevated; and in the construction of the doors and door frames and the arrangement of the glass windows and guides therefor.

In describing this invention, reference is had to the accompanying drawings, in which like characters designate corresponding parts in all the views.

Figure 1 is a side elevation, partly broken away, of a vehicle body embodying my invention.

Figures 2 and 3 are edge views of the free edge of the door and the opposing edge face of the door frame.

Figure 4 is a sectional view on line 4—4, Fig. 3.

Figures 5, 6 and 7 are combined sectional views on lines 5—5, 6—6, 7—7, Figs. 2 and 3.

Figure 5ª is a detail view of parts seen in Fig. 5 illustrating a slightly modified joint between the sheathing of the door and each face plate of the door.

Figure 8 is a sectional view on line 8—8, Fig. 3.

Figures 9 and 10 are sectional views on lines 9—9, and 10—10, respectively, Fig. 1.

Figure 11 is a sectional view on line 11—11, Fig. 10.

Figures 12 and 13 are sectional views on lines 12—12, and 13—13, respectively, Fig. 1.

Figure 14 is an enlarged detail sectional view of parts seen in Fig. 7.

Figures 15 and 16 are sectional views on lines 15—15 and 16—16 respectively, Fig. 1.

1 designates the body comprising horizontal and vertical frame members and curved frame members conforming to the curve in the fenders, an outer metal body casing and inner lining.

3 and 4 are windows movable vertically into and out of the doors 5, and into and out of panels as 6. The windows are guided in ways in the door or panel and by uprights 7 formed with ways or guides extending above the upper edge of the body to the canopy or roof of the top, and constituting extensions of the guide, window guides in the doors, and panels.

8 is the fender on the body, such fender extending across the lower corner of the panel 6. 9 is a side wall of the top, it being here shown as a forward extension on the back curtain 10 and having its forward end portion 11 arranged above the upper rear corner of the panel 6 and having its top edge 12 substantially parallel to the curve of the front portion of the fender 8, which portion extends across the lower corner of the panel 6. The window 4, which moves into and out of the panel 6, has its lower rear corner portion cut away to conform when down to the curve of the fender 8 or the frame member 8ª to which the fender is secured, and when elevated, such cut away portion conforms to the curve of the top edge 12 of the wall 9. When the window is lowered, it is concealed within the panel 6. The window is raised or lowered by any suitable means.

The lower margin of the window is sheathed in a suitable metal channel 13, Fig. 12. The portion of the channel above the forward end of the fender seats in the metal lined channel 14 formed in the curved frame member 8ª to which the fender is attached.

The vertical guides for the window 4 are substantially the same as those for the window 3, which will now be described in connection with the door and door frame construction.

The doors, as the door 5, in addition to the outer metal sheathing 5ª and interlining comprises upright members 15 and 16, at its hinged edge and upright members 17 and 18 at its free edge and suitable horizontal frame members 19. The frame members 15, 16 or 17, 18 are spaced apart in the direction of the thickness of the door, that is, widthwise, and a spacing member 20 here shown as in the form of a metal rectangular tube is located between the members 15, 16 or 17, 18, each of said spacing members being formed with a channel or guide 19ª presented toward the interior of the door frame, and serving as a guide for the window 3 or 4, the member 20 being arranged at a straight angle or in line with the window 3 or 4. Each guide or channel is provided with a lining 21 of cushioning material engaging the margin of the window, which is preferably a glass pane without a sash. Owing to the arrangement of the window, and the spacing members 20 in which it is guided, and to the facing strips and edge face plates to be presently described, the strain on the glass, as when slamming the door, is at a right angle to the glass or not in a plurality of directions and liability of breaking the glass is lessened. The frame of the door and the panels of the body are also provided with similar frame members 22, 23, and spacing members 26.

The opposing edges of the door and door frame are provided with facing strips, those at the free edge of the door and the opposing edge of the frame being designated 27, 28 respectively, Figs. 2 and 3, and those at the hinged edge of the door and the opposing edge of the frame being designated 29 and 30, Fig. 10.

The facing strip 27 is secured to the frame members 17, 18 as by screws 31. It lies against the beveled or inclined faces of the frame members and is formed with jogs or insets 32, Fig. 5, forming shoulders for engaging buffers 33 located in similar jogs or insets 34 in the opposing face plate 28 of the door frame. There are two of such insets or jogs 32 located near the upper and lower edges of the door and also two recesses 34 in the face plate 28 of the door frame. The face plate 27 is also formed with an inset 35, Fig. 7, in which the latch or bolt 36 of the door latch mechanism moves, and the face plate 28 is formed with an inset 37 registering with the bolt 36 and in which are located a latch or keeper plate 38. The face plates 27 and 28 are also formed with opposing jogs or insets 39, 40, Fig. 6, for receiving door checking devices, as spring tongues 41 projecting from the base plate 42 in the recess of the plate 28, and a wedge 43 for entering between the tongues, the wedge projecting from the base plate 44 in the recess in the plate 27, the wedge and tongues being spoken of in shop parlance as dove tails. The frame members 17 and 18 or 22 and 23, are recessed at their edges to receive the insets or recesses formed in these face plates and the bottoms of the recesses in the face plates overlie the outer edges of the guide spacing members 20 and are secured therein, and such bottoms are arranged at substantially a right angle to the plane of the glass panes. These spacing members 20 at their outer edge are formed with channels 45 having anchor strips therein to which the face plates are secured, or to which other articles, as buffers, latch plates and the like, are secured.

The members 20 in the door or door frame are provided with upward extensions 7 extending to the roof or canopy in which extensions the windows are guided, as seen in Fig. 9, and the channels 45 of these extensions are provided with suitable weather strips of metal or rubber designated 49 and 50, Fig. 9. The face plates 29 at the hinged edge of the door, as seen in Fig. 10, overlie the frame members 15, 16, and the spacing member 20 and are secured to anchors 51 in the dove-tail channels of the spacing members.

52 are hinge leaves secured to the door and overlying the face plate 29 at the hinged edge of the door and lying, when the door is closed, in the recesses 53 formed in the door frame, these hinge leaves are pivoted at 54 to complemental hinge leaves 52 secured to the door frame and also located in said recesses 53.

The door latch, in addition to the latch or bolt 36, includes a shank 55 extending transversely through the frame members 17, 18 and the interposed spacing member 20 and having a handle 56 thereon, at its outer end, the shank 56 of the handle being journaled in a sleeve or bearing 57, Fig. 14 extending into a counterbore in the frame member 18 and secured thereto as by nails 58, as shown in Fig. 14, driven obliquely through holes in the outer end of the bearing into the frame members. Heretofore such sleeves have been threaded into the frame members thus necessitating threading of the sleeve and the hole in the frame.

The face strips, 27, 28, are suitably interlocked with the metal sheathing in the body or door, and as shown in Figs. 5 and 5ª, they are formed with flanges 59 at their outer edges around which the margin of sheathing of the outer body is folded. Also, the sheathing on the door may be similarly secured to a facing strip 60 along the lower edge of the door, as seen in Fig. 13.

The uprights 7 of door are connected at their tops by a hollow member 61, similar to the uprights 7, see Fig. 16, and the upright 7 at the hinged edge of the door and the member 61 are provided respectively with weather strips 62, 63, Figs. 15 and 16, the weather strip 62 of the upright 7 extending in a groove 64 in the contiguous frame member 65.

Owing to the relative arrangement of the frame members, spacing members, edge face plates and the windows, the construction is rigid and free of opposing vibrations and the strain on the glass as when slamming the door is at a right angle to the plane of the glass.

What I claim is:

1. In an automobile body, door and window construction the combination of a framing including spacing members comprising metal strips spaced apart and formed with lengthwise channels on their inner opposing edges for forming guides, a sashless window pane movable along the guides, said strips having upward extensions beyond the upper edge of the door and the body and said extensions forming guides for the window panes when in elevated position out of the door or the body, metal edge facing strips for the exposed edges of the framing, an outer metal sheeting on the door or body, each edge facing strip being interlocked at its outer edge with the sheeting, and means securing said edge facing strips to the underlying spacing members.

2. In an automobile body, door and window construction the combination of a framing including spacing members comprising metal strips spaced apart and formed with lengthwise channels on their inner opposing edges for forming guides, a sashless window pane movable along the guides, said strips having upward extensions beyond the upper edge of the door and the body and said extensions forming guides for the window panes when in elevated position above the door and the body, metal edge facing strips for the exposed edges of the framing, outer metal sheeting on the door or body, each edge facing strip being interlocked at its outer edge with the sheeting, means securing said edge facing strip to the underlying spacing members, the underlying spacing members being formed with channels at their outer edges and fillers located in the channels, the edge facing strip being secured to the fillers.

3. In an automobile door construction, the combination of upright frame members spaced apart in the direction of the thickness of the door, metal strips spacing said members apart and formed with lengthwise channels on their inner edges forming guides toward the interior of the door, a sashless window pane movable in the guides and a latch mechanism carried by the frame members and including a handle having a shank extending transversely of the frame members through the interposed metal strip.

4. In an automobile door construction the combination of upright frame members spaced apart in the direction of the thickness of the door, metal strips spacing said members apart and formed with lengthwise channels in their inner edges forming guides toward the interior of the door, a sashless window pane movable in the guides and a latch mechanism carried by the frame members and including a handle having a shank extending transversely of the frame members through the interposed metal strip, an edge facing strip covering the exposed edges of the frame members, means for securing the edge facing strip to the outer edge of the spacing strip underlying the edge of said facing strip, the facing strip having an annular flange along its outer edge and an outer sheeting for the door folding around said flange to interlock therewith.

5. In an automobile, door and window construction the combination of a framing including spacing members comprising upright hollow sheet metal strips formed with guides for a sashless window pane and with means for receiving a filler along the outer edge of the framing, an outer metal sheeting and edge facing strips secured to the former strips by screws extending into said filler, the facing strip being interlocked with the sheeting.

6. In an automobile body, door and window construction the combination of a framing comprising hollow sheet metal strips formed with guides for a sashless pane, the strips being provided at their outer edges with grooves for supporting a filler in the groove and an edge facing strip secured to the framing by screws extending into said filler.

7. In an automobile, body, door and window construction the combination of a framing including spacing members comprising upright parallel sheet metal strips rectangular in general cross section and formed with lengthwise channels on their inner edges, the strips extending above the upper edge of the body of the door and a member connecting the upper ends of said strips, and door latch mechanism including handle having a shank extending through one of said strips.

8. In an automobile body, door and window construction, the combination of upright parallel frame members spaced-apart in the direction of the thickness of the door and the body, metal strips spacing said members apart and formed with lengthwise channels on their inner edges for forming guides, sashless window panes movable along the guides, said spacing strips having upward extensions beyond the upper edge of the door and the body forming guides for the window panes when in elevated position out of the door and the body, metal facing strips for the exposed edges of the frame members, an outer metal sheeting, each facing strip being interlocked at its outer edge with the sheeting, means securing said edge facing strips to the underlying spacing strips, the spacing strips being formed with channels at their outer edges, and fillers located in the last mentioned channels, the edge facing strips being secured to the fillers.

9. In an automobile body, door and window construction, the combination of upright parallel frame members, spaced-apart in the direction of the thickness of the door and the body, metal strips spacing said members apart, and formed with lengthwise channels on their inner edges for forming guides, sashless window panes movable along the guides, said spacing strips having upward extensions beyond the upper edge of the door and the body forming guides for the window panes when in elevated position out of the door and the body, a metal facing strip for the exposed edges of the frame members, an outer metal sheeting, each facing strip being interlocked at its outer edge with the sheeting, the spacing strips being formed with channels at their outer edges, and fillers located in the last mentioned channels, each edge facing strip being secured to the underlying filler, the extensions of the spacing strips also having channels in their outer edges, and weather strips arranged in the last mentioned channels.

10. In an automobile body, door and door frame construction, the combination of a door having spaced apart frame members at its free edge, a spacing member between the frame members and formed with a guide channel at one edge, a window pane having its edge movable in the channel, an edge facing strip on the door having insets therein, and the opposing edge of the door frame being also provided with a face plate having complemental insets, buffers and door latching means arranged in the insets, the bottoms of such insets engaging the edges of the spacing strips and being secured thereto, substantially as and for the purpose described.

11. In an automobile body, door and door frame construction, the combination of a door having spaced apart frame members at its free edge, a spacing member between the frame members and formed with a guide channel at one edge, a window pane having its margin movable in the channel, an edge facing strip on the door having insets therein, and the opposing edge of the door frame being also provided with a face plate having complemental insets, buffers and door latching means arranged in the insets, the bottoms of such insets engaging the edges of the spacing strips and being secured thereto, the bottoms of the insets being arranged in planes at substantially right angles to the plane of the window, substantially as and for the purpose specified.

12. In an automobile body, door and window construction, the combination of a door having upright spaced apart frame members and spacing members between the frame members, the spacing members being formed with channels presented toward the interior of the door forming guides, window panes movable vertically in the door and body and having their margins movable in said guides, the spacing members being arranged at a right angle with the plane of the window and the body being also formed with similar spaced apart frame members opposed to the free edge of the door and a spacing member between such frame members formed with a channel forming a window guide, the spacing member on the body being also arranged at a right angle to the plane of the window, metal facing strips on the opposing edge faces of the door and the body, said facing strips being arranged at an inclined angle to the plane of the window and having complemental insets for receiving buffers and door latching means, the bottoms of the insets being secured to the spacing strips and arranged in planes at substantially right angles to the planes of the windows, substantially as and for the purpose specified.

In testimony whereof, I have hereunto signed my name, at Syracuse, in the county of Onondaga, and State of New York, this 17th day of March, 1923.

LEWIS J. MORGAN.